United States Patent [19] [11] 4,268,318
Stone [45] May 19, 1981

[54] ASPHALT AND EMULSIONS THEREOF FOR PAVEMENTS

[75] Inventor: Eugene M. Stone, Denver, Colo.

[73] Assignee: Penelizer Corporation, Denver, Colo.

[21] Appl. No.: 56,347

[22] Filed: Jul. 10, 1979

[51] Int. Cl.³ .............................................. C08L 95/00
[52] U.S. Cl. .................................. 106/277; 106/284; 208/22; 252/311.5
[58] Field of Search .................. 106/277, 284; 208/22, 208/45; 252/311.5

[56] References Cited

U.S. PATENT DOCUMENTS

| | | | |
|---|---|---|---|
| 2,409,258 | 10/1946 | Davis et al. | 106/277 |
| 2,418,135 | 4/1947 | Moore et al. | 106/284 |
| 3,216,336 | 11/1965 | Benson | 94/23 |
| 3,344,082 | 9/1967 | Montgomery et al. | 106/277 |
| 3,374,104 | 3/1968 | Baum et al. | 106/284 |
| 3,399,608 | 9/1968 | Benson | 94/23 |
| 3,912,678 | 10/1975 | Azar et al. | 106/277 |

*Primary Examiner*—Hosea E. Taylor
*Assistant Examiner*—Amelia B. Yorbrough
*Attorney, Agent, or Firm*—Cushman, Darby & Cushman

[57] ABSTRACT

An asphalt base stock comprising a solvent refined asphalt having a penetration less than 25 and low ductility mixed with an asphalt cement. The base stock has a low penetration, 25–45, but unexpected high ductility, 150+. The base stock is especially suited for emulsification. When mixed with soils and aggregates, as for road surfaces, the stabilized product exhibits a significant increase in bearing strength over comparable asphalt-emulsion pavements and hot-mix asphalt pavements.

14 Claims, No Drawings

ASPHALT AND EMULSIONS THEREOF FOR PAVEMENTS

BACKGROUND OF THE INVENTION

The present invention relates to asphaltic compositions and, more particularly, to asphaltic compositions for use in soil stabilization and recycling of old asphalt pavements.

Historically, the early asphalt roads in the United States were built with Trinidad Lake asphalt, from the Island of Trinidad. After the discovery of asphaltic crude oils in this country, the residue, mostly asphalt, from the distillation of these oils was used for road oiling. Later, asphalts cut back with volatile solvents were mixed into or applied to the road surfaces as primers or to produce road pavements. Hot mix pavements came into use in which asphalt is heated and mixed with aggregate, and laid to produce a pavement. Also, asphalt emulsions were developed. At the present time, the ecological and energy drawbacks of hot mix and cut-back asphalts have brought asphalt emulsions to the front since they avoid the use of organic solvents and expensive hot mixing, thereby saving energy and reducing air pollution.

Selection of paving asphalts has traditionally been made on the basis of penetration, viscosity and ductility. Penetration, a well known test, is an indication of the hardness of an asphalt. In the past, the general assumption was that asphalts with a penetration below 35 at 77° F. were too hard and brittle for use in paving. Softening point is another indication of quality which is hereinafter further discussed.

For years it has been realized that distilling crude oil by the prior conventional methods, including oxidation, to produce low penetration asphalt destroyed the ductility of the asphalt. However, after the introduction of solvent refining processes, it was eventually realized that asphalts could be produced with low penetration while preserving high ductility. U.S. Pat. No. 3,216,336 to Jewell R. Benson discloses a cut back penetrative binder for stabilizing soil and road surfaces. This binder includes a selected hard asphalt cement having a penetration less than 25 and even down to 0. The selected asphalt is usually a solvent refined or steam refined type and is characterized, and may be defined by relationship of hardness to softening point, as set forth in U.S. Pat. No. 3,216,336.

To gain the ecological advantages inherent in an emulsion, Mr. Benson used a small amount of volatile solvent in a hard base asphalt to permit the same to be emulsified, as disclosed in U.S. Pat. No. 3,399,608. Later, it was discovered that the hard base asphalt could be emulsified directly. Both products had the desirable property of imparting to pavements high compressive strength, far exceeding the strength of pavements made with comparable standard emulsions and even exceeding the strength of the more expensive hot mix pavements.

The limitations of Benson's products, were for priming and soil stabilization. His products, when cured, were deficient in ductility and cementing value. However, the developments by Benson were a step in the right direction toward stronger and more durable pavements.

Thus, there is still a need in the art for an asphalt composition which has the high strength of the selected low penetration asphalt; which can be easily emulsified; and which exhibits high ductility and low softening point so that, when emulsified and mixed with aggregate, it will produce pavements with greater load carrying capacities, greater water resistance and greater stability while at the same time retaining the desirable characteristics of flexibility. Only a very few naturally occurring asphalts have such desirable properties as more fully hereinafter set forth. One example is the Trinidad Lake asphalt. Other examples are certain special crudes in California, Iran and Canada. However, these materials are limited in supply and not generally available. There is a need for a blend which can be obtained nationwide and which has the desirable properties of such limited materials.

SUMMARY OF THE INVENTION

With the foregoing and other considerations in view, the present invention was conceived and developed and comprises, in essence, an asphalt base stock having a low penetration, yet high ductility. The penetration may be in the range of 25 to 50 (77° F.) and the ductility will exceed 100 centimeters and preferably more than 150 centimeters, the limit of ductility testing equipment. It is especially suited for use as an asphalt emulsion which can be mixed with aggregate for paving purposes.

The base stock comprises a first component, hereinafter called "asphalt pitch." This pitch has a penetration less than 25 (77° F.) and a softening point which is approximately 185° F. minus three times the penetration, in accordance with the criteria established in U.S. Pat. No. 3,216,336, the description of which is hereby incorporated by reference. The preferred pitch has a penetration less than 10, as hereinafter appears. The ductility of this pitch is low, essentially 0, imparting a tendency towards brittleness.

The base stock includes a second component, a conventional asphalt cement having a penetration between 60–300 (77° F.). The asphalt cement requirement is set forth in the ANSI/ASTM D 3381-76, the standard specification for VISCOSITY-GRADED ASPHALT CEMENT FOR USE IN PAVEMENT CONSTRUCTION (AUGUST, 1976). The asphalt pitch and asphalt cement are blended in varying proportions to produce the "base stock", which will have a penetration below 45 and a ductility greater than 100 cm and preferably greater than 150 cm. A further desirable property of the base stock is a low softening point, below 150° F., a property indicating resilience and cohesion in the base stock. The proportions of asphalt pitch and asphalt cement may be determined by routine experimentation as described hereinafter and have generally been found to include 20–40% asphalt pitch.

The improved base stock is especially suited to produce an improved emulsion. Such an emulsion will have water as the continuous phase and may be anionic or cationic, although the latter is usually preferred to impart anti-strip properties when blended with aggregate. When the emulsion is mixed with aggregate, an improved stabilized product such as a roadbed or pavement is formed. The final product has a surprisingly high bearing strength and is resistant to water saturation.

A further use of asphalt emulsion, produced as above set forth, is related to recyclng of old, hard brittle pavement which has deteriorated beyond further use as pavement. When such old pavements are crushed and treated with even small amounts of conventional asphalts or standard asphaltic emulsions, the new pavement is unstable because it contains too much asphalt and has insufficient bearing strength. The instability of a pavement or the like, formed by such a mixture is evidenced by corduroying and rutting. However, it was discovered that this problem was avoided when the improved emulsion is mixed with old crushed asphaltic pavement. The hard but ductile base stock in the improved emulsion does not soften the old asphalt but, surprisingly, increases the strength and load bearing capacity to values greater than the original pavement, when new. When the above synergistic result was discovered, Mr. Benson was consulted to ascertain the reason. He concluded that the base stock adheres to the old pavement particles the same as if such pavement particles were regular aggregate and were not softened. It is not known precisely what occurs but this is clearly a new and unexpected result and solves the problems being encountered in trying to use an aggregate of old asphaltic pavement with conventional asphalts and standard emulsions.

DESCRIPTION OF THE PREFERRED EMBODIMENT

In General

The present invention utilizes an asphalt pitch which must be solvent extracted, vacuum reduced, or an equivalent thereof, as previously defined by Benson. The low penetration asphalt, below 25, is blended with a conventional paving asphalt cement, having a penetration of 60–300. Suitable asphalt pitches include: Cenex, from Laurel, Mont.; Lyon Oil Company, Eldorado, Ark.; Union Oil Co. of California, Nederalnd, Tex. Pitches of similar quality are available throughout the country and many refineries can produce a pitch suitable for this purpose. Conventional asphalt cements are generally available from most asphalt refineries and are supplied according to required specifications.

Penetration figures given herein are those determined by ASTM-D-5; ductility is determined by ASTM-D-113; and softening point by ASTM-D-36. The softening point is included in the present description to distinguish the present compositions from asphalts, having high softening points which are generally hard and brittle and unsatisfactory for highway purposes.

Table I below shows properties of an improved base stock composition compared to other known hard base asphaltic materials:

TABLE I

| Sample | 1 Improved Base Stock | 2 United II | 3 United III | 4 Trambull IV | 5 Ac-10 |
|---|---|---|---|---|---|
| Penetration at 77° F. | 39 | 19 | 26 | 19 | 70–105 |
| Softening Point, °F. | 128.5 | 164.5 | 188.5 | 205 | 92 |
| Ductility at 77° F. 5 cm/min | 150+ | 4.75 | 2.5 | 2.0 | 100+ |

The improved base stock, item 1, was prepared as hereinafter described and consists of a pitch obtained from Cenex Refinery of Laurel, Mont. blended with an asphalt cement obtained from the same refinery. Items 2–4 represent known hard asphalts used for roofing products. Their very low ductilities make them undesirable for use in paving applications. Sample 5, AC-10, is a standard paving grade asphalt manufactured by Cenex Refinery according to ANSI/ASTM-D-3381.

The foregoing Table I demonstrates that the properties of the improved base stock are unlike those of any prior art asphalt composition used for paving purposes and it would appear that the improved base stock is more nearly equivalent to roofing asphalts except that it possesses high ductility, a property not found in roofing asphalts.

EXAMPLES AND TESTS

Example I

A base stock was provided using an asphalt pitch from Cenex Refinery of Laurel, Mont. having the following properties:
Penetration: 0 at 77° F.
Softening Point: 198° F.
Ductility: 5 (cm)

An asphalt cement was provided which is designated by ANSI/ASTM-D-3381, commonly called AC-10. The asphalt cement was produced from the Cenex Refinery and has the following properties:
Penetration: 70–105 at 77° F.
Softening Point: 92° F.
Ductility: 100+ (cm)

20% pitch was blended with 80% asphalt cement to produce a base stock having the following properties:
Penetration: 39
Softening Point: 128° F.
Ductility: 150+ cm This base stock having a penetration in the desirable range of 25–45 and a high ductility has the desirable properties such as would be produced by a Trinidad asphalt, and tests were made to determine its properties as hereinafter set forth.

Example II

An asphalt pitch was provided from Lyon Oil Co. refinery of Eldorado, Ark. having the following properties:
Penetration: 7
Softening Point: 195° F.
Ductility: 5 cm The asphalt cement, an AC-10, from the Cenex Refinery, used in Example 1, was blended with the pitch in the proportions of 40% pitch and 60% asphalt cement to produce a base stock having the following properties:
Penetration: 33
Softening Point: 130° F.
Ductility: 150+ cm Again this base stock has the desirable properties heretofore noted.

Example III

An asphalt pitch was provided from Union Oil Company of California Refinery of Nederland, Tex. having the following properties:
Penetration: 6
Softening Point: 189° F.
Ductility: 4 cm The asphalt cement, an AC-10 from the Cenex Refinery, used in Example 1, was blended with the pitch in the proportions of 40% and 60% asphalt cement to produce a base stock having the following properties:
Penetration: 40
Softening Point: 125° F.
Ductility: 150+ cm Again this base stock has the desirable properties heretofore noted.

Example IV

The base stock of Example I was emulsified with the water being the continuous phase. The emulsion was a cationic emulsion containing 39% water.

Example V

The base stock of Example II was emulsified with the water being the continuous phase. The emulsion was a cationic emulsion containing 39% water.

Example VI

The base stock of Example III was emulsified with the water being the continuous phase. The emulsion was a cationic emulsion containing 39% water.

Example VII

For comparative purposes, independent laboratory tests were made by Lord Laboratories of Boulder, Colo., to determine through test specimens the comparative compressive strength of hot mix pavements, using a standard 85-100 penetration hot mix asphalt cement obtained from Flat Iron Paving Co., Boulder, Colo., with an emulsion pavement using the asphalt emulsion of Example IV. Hot mix pavements are considered as being stronger and better than emulsion pavements; thus, these tests are conservative. These tests were performed according to ANSI/ASTM D 1074-76.

The aggregate used in testing was a Colorado Highway Department specification ¾", obtained from Boulder Creek, Colo. The gradation was as follows:

| | | | Percent Passing Sieve Size | | | | | | |
|---|---|---|---|---|---|---|---|---|---|
| ¾ | ½ | ⅜ | #4 | #8 | #16 | #30 | #50 | #100 | #200 |
| 100 | 94 | 81 | 67 | 56 | 46 | 31 | 17 | 10 | 6.4 |

Three hot mix specimens were prepared individually by heating and mixing the aggregate with asphaltic cement, 5.8% by weight, at a temperature of 270° F. The mix was compacted into cylindrical specimens which were slowly cooled, all according to procedures described in ASTM-1074.

Three emulsion specimens were prepared individually by mixing aggregate with sufficient asphalt emulsion of Example IV to provide a final asphalt content of 5.8% by weight. Each mix was then compacted into a cylindrical specimen and then cured for 8 days, all according to a standard procedure.

All six specimens were tested in unconfined compression at room temperature. The results are as follows:

| Samp. No. | Aggr. | Cement | A.C. Cont. | Strength Psi | % Strain | Sp.Gr. | Ht. Cm. | Diam. Cm. |
|---|---|---|---|---|---|---|---|---|
| 1 | ¾" | Exam. IV | 5.8 | 910 | 7.32 | 2.255 | 10.42 | 10.23 |
| 2 | ¾" | Exam. IV | 5.8 | 926 | 8.45 | 2.229 | 10.51 | 10.24 |
| 3 | ¾" | Exam. IV | 5.8 | 750 | 4.77 | 2.220 | 10.64 | 10.24 |
| Avg. | | | 5.8 | 862 | 6.85 | 2.235 | 10.52 | 10.24 |
| 4 | ¾" | 85/100 | 5.8 | 191 | 4.58 | 2.238 | 11.10 | 10.29 |
| 5 | ¾" | 85/100 | 5.8 | 147 | 4.39 | 2.228 | 11.57 | 10.31 |
| 6 | ¾" | 85/100 | 5.8 | 136 | 3.28 | 2.206 | 11.62 | 10.31 |
| Avg. | | | 5.8 | 158 | 4.08 | 2.224 | 11.43 | 10.30 |

Such tests demonstrate that a pavement produced with the improved emulsion, such as Example IV, will have a bearing strength as much as five times that of a standard hot mix pavement. Naturally, the asphalt percentage in various pavements will vary, but the best percentage can be easily established and will be in the general range of about 6 percent.

Example VIII

For comparative purposes, tests were made on a sand from Parker, Colo., having the following gradation:

| Percent Passing Sieve Size | | | | |
|---|---|---|---|---|
| #4 | #10 | #40 | #80 | #200 |
| 100 | 99 | 67 | 34 | 20 |

The sand specimens were prepared and tested in a manner similar to the aggregate specimens of Example VII, except the specimens were 2-inches in diameter and in height. Also, the asphaltic content, by weight, of the emulsion (of Example IV) was 4.345% and the asphalt content of the 85-100 hot mix asphaltic cement was 6.0%. The test results are as follows:

| Samp. | Aggr. | Cement | A.C. Cont. | Strength Psi | % Strain | Ht. Cm. | Diam. Cm. |
|---|---|---|---|---|---|---|---|
| A | Sand | Exam. IV | 4.345 | 927 | 5.35 | 5.08 | 5.08 |
| B | Sand | 85/100 | 6.0 | 335 | 5.50 | 5.08 | 5.08 |

Again, a substantially greater bearing strength is obtained with the improved asphalt emulsion using sand.

Example IX

Some types of aggregate are susceptible to water action, and although they may be stabilized with conventional emulsion or hot mix asphalts, they usually lose strength when submerged in water. A specification material meeting all Colorado State specifications except that it did not "remotely approach the water test requirement" was obtained from Cooley Sand and Gravel of Jefferson County. The specification requires that the retained strength, after water submersion of test specimens, be 70% of dry test for surface pavement and 50% of the dry test for a base course. By use of a 15% emulsion, 9.2% asphalt, test specimens of the Cooley Sand and Gravel Company had a retained strength of 100% of comparable dry specimens. This is a significant and important advance in the art. Conventional specification blends using 9.2% asphalt, approximately 150% of the normal amount, are inherently unstable, but the stability with the improved base stock applied as an emulsion produced stable specimens with no loss of strength.

Example X

To produce a specification gradation as noted in Example VII, it is common to discard certain sizes of aggregates and the disposition of such sizes can be a serious problem, the discarded sizes usually being pea gravel or smaller. A quantity of reject limestone, ⅜" minus gradation at Salida, Colo., was used to build a mile of pavement, with an improved emulsion substantially the same as Example IV. The pavement used sufficient emulsion to provide 5.4% asphalt and was specified as being 2½-inches thick. It was a private road for heavy traffic and heavy vehicles, 80,000 pound mine trucks. In the short period of use, about 10 months, no significant damage has occurred to this pavement. This demonstrates that the improved asphalt base stock, applied as an emulsion, can be used to make pavements with other than specification aggregate.

Example XI

The amount of material reclaimed from asphalt roadbeds is truly voluminous, especially since machinery has been developed to scarify and plane off existing pavements. Attempts to use this material with the addition of conventional asphalts has been generally unsuccessful, primarily because an excess of conventional asphalt will lubricate the rock particles and cause instability of the roadbed when under stress. Additional aggregate is required to stabilize such a pavement. A small quantity of reclaimed roadbed material stored by the Colorado Highway Department in Mesa County near Grand Junction, Colo., was mixed with the emulsion of Example IV, and test specimens were prepared. The additional asphalt emulsion was 5%, i.e. 3% asphalt. The result was a stable mix with surprising high compressive strength and good stability. There was no need for adding new aggregate, indicating again a result which cannot be obtained with conventional emulsions or hot mixes.

I have now described my invention and its advantages in considerable detail. It is obvious that others skilled in the art can devise and develop alternate and equivalent blends which are within the scope and spirit of my invention. Hence, I desire that my protection be limited, not by the detail described, but only by the proper scope of the appended claims.

What is claimed is:

1. In an asphalt base stock for pavements having the following properties: a penetration in the range of 25 to 50 (77° F.); a softening point below 150° F. and a ductility exceeding 100 cm., wherein said base stock is formed by blending an asphalt pitch and a hard base asphalt cement, the pitch being an asphalt with the general characteristics of a solvent refined asphalt having a penetration below 25 and the softening point is in the approximate range of 185° F. minus 3 times the penetration and the asphalt cement has a penetration between 60 and 300.

2. The base stock defined in claim 1, wherein the ductility exceeds 150 cm.

3. The base stock defined in claim 2, wherein the asphalt pitch has a penetration less than 10 and the softening point is less than 200° F., wherein the asphalt cement is an AC 10 grade having a penetration in the 70–105 range and the general proportions of the base stock is in the range of 20 to 40 percent asphalt pitch and 80 to 60 percent asphalt cement.

4. An emulsion of the base stock defined in claim 1 and water, wherein the water is the continuous phase thereof.

5. The emulsion of claim 4, wherein the water content is approximately 39 percent by weight.

6. An emulsion of the base stock defined in claim 2 and water, wherein the water is the continuous phase thereof.

7. A pavement formed by a graded aggregate and the asphalt base stock defined in claim 1, and wherein the asphalt content therein is in the general range of 6 percent, by weight, of the asphalt-aggregate blend.

8. A pavement formed by aggregate discards and the asphalt base stock defined in claim 1, wherein the asphalt content is in the general range of 6 percent and the aggregate discards are the remains of a soil which has been previously graded to produce a specification aggregate.

9. A pavement formed by an aggregate and asphalt, in which the aggregate is susceptible to water action and cannot retain strength after submergence and saturation in water, wherein the asphalt consists of a base stock as defined in claim 1 and wherein the asphalt content is in the general range of 9 percent of the asphalt-aggregate blend, or approximately 150 percent of the normal amount to be used.

10. A pavement formed by an existing old asphaltic pavement crushed to simulate an aggregate and an asphalt base stock as defined in claim 1, wherein the base stock asphalt content of the pavement is in the general range of 3 percent.

11. A method for the preparation of the asphalt base stock of claim 1 for blending with an aggregate including the step of converting the asphalt into an emulsion wherein the asphalt content thereof is in the range of 60 percent.

12. A method for the preparation of a pavement formed by aggregate and the base stock defined in claim 1, wherein the asphalt content therein is in the range of 6 percent by weight, of the asphalt-aggregate blend, including the steps of:
 (a) emulsifying the base stock;
 (b) blending the emulsion with aggregate;
 (c) laying and compacting the blend as a pavement surface; and
 (d) allowing the emulsion to break down and the water component thereof to leave the pavement and the asphaltic component to bind with the aggregate.

13. The method defined in claim 12, wherein the aggregate is a specification graded aggregate.

14. The base stock of claim 1 wherein the asphalt pitch has a penetration of about 0, a softening point of about 198° F., and a ductility of about 5 cm.

* * * * *